United States Patent
Keidar et al.

(10) Patent No.: US 12,044,220 B2
(45) Date of Patent: Jul. 23, 2024

(54) TWO-STAGE LOW-POWER AND HIGH-THRUST TO POWER ELECTRIC PROPULSION SYSTEM

(71) Applicant: The George Washington University, Washington, DC (US)

(72) Inventors: Michael Keidar, Washington, DC (US); Denis Zolotukhin, Tomsk (RU); Siva Ram Prasad Bandaru, Washington, DC (US)

(73) Assignee: THE GEORGE WASHINGTON UNIVERSITY, Washington, DC (US)

( * ) Notice: Subject to any disclaimer, the term of this patent is extended or adjusted under 35 U.S.C. 154(b) by 0 days.

(21) Appl. No.: 17/802,468

(22) PCT Filed: Feb. 22, 2021

(86) PCT No.: PCT/US2021/019073
§ 371 (c)(1),
(2) Date: Aug. 25, 2022

(87) PCT Pub. No.: WO2021/221767
PCT Pub. Date: Nov. 4, 2021

(65) Prior Publication Data
US 2023/0136486 A1    May 4, 2023

Related U.S. Application Data

(60) Provisional application No. 62/981,828, filed on Feb. 26, 2020.

(51) Int. Cl.
*F03H 1/00* (2006.01)
*B64G 1/40* (2006.01)

(52) U.S. Cl.
CPC .......... *F03H 1/0081* (2013.01); *B64G 1/411* (2023.08); *B64G 1/413* (2023.08); *B64G 1/415* (2023.08); *F03H 1/0068* (2013.01)

(58) Field of Classification Search
CPC ........ B64G 1/405; B64G 1/409; B64G 1/411; B64G 1/413; F03H 1/00; F03H 1/0081; F03H 1/0087
See application file for complete search history.

(56) References Cited

U.S. PATENT DOCUMENTS 2,992,345 A * 7/1961 Siegfried .................. H05H 1/54
310/11
3,159,966 A * 12/1964 Curtis ...................... H01J 27/16
60/202

(Continued)

FOREIGN PATENT DOCUMENTS

WO    WO-2019/075051 A1    4/2019

OTHER PUBLICATIONS

International Search Report and Written Opinion for PCT/US2021/019073 dated Oct. 22, 2021, 10 pgs.

(Continued)

*Primary Examiner* — Kyle Robert Thomas
(74) *Attorney, Agent, or Firm* — BLANK ROME LLP

(57) ABSTRACT

A satellite propulsion system and methods of operating the same include a first ionization stage and a second acceleration stage. The first ionization stage has a plasma source configured to produce an arc discharge and emit a preliminary plasma. The plasma source includes an external magnetic field configured to magnetize the arc discharge. The second acceleration stage has an accelerator positioned in series with the plasma source. The accelerator is configured to accelerate the preliminary plasma out through the accelerator, thereby creating an accelerated plasma flow. The application of an activation threshold voltage to the accelerator results in a surge in system performance parameters.

20 Claims, 9 Drawing Sheets

(56) References Cited

U.S. PATENT DOCUMENTS

| | | | |
|---|---|---|---|
| 3,447,322 | A | 6/1969 | Mastrup |
| 4,928,027 | A * | 5/1990 | Deininger ............... H05H 1/34 |
| | | | 310/11 |
| 7,294,969 | B2 | 11/2007 | Kuninaka |
| 9,145,216 | B2 * | 9/2015 | Gascon .................... F03H 1/00 |
| 10,107,271 | B2 * | 10/2018 | Keidar .................. B64G 1/415 |
| 10,260,487 | B2 * | 4/2019 | Yamazaki ............... H05H 1/54 |
| 2016/0115946 | A1 | 4/2016 | Slough et al. |
| 2020/0361636 | A1 | 11/2020 | Keidar et al. |

OTHER PUBLICATIONS

International Search Report and Written Opinion for PCT/US2021/019073 dated Nov. 17, 2021, 8 pgs.

Beijing Xinwei Telecom Techn: "Discussion on Enhancement of V2X Resource Allocation", 3GPP Draft; R1-157534 Discussion on Enhancement of V2X Resource Allocation, $3^{rd}$ Generation Partnership Project (3GPP), Mobile Competence Centre; vol. RAN WG1, Nov. 24, 2015, 8 pgs.

Oppo: "Physical Layer Structure for NR-V2X", 3GPP Draft; R1-1908361 Phy Layer Structure, $3^{rd}$ Generation partnership Project (3GPP), Mobile Competence Centre; vol. RAN WG1, Aug. 16, 2019, 16 pgs.

\* cited by examiner

Fig. 2a
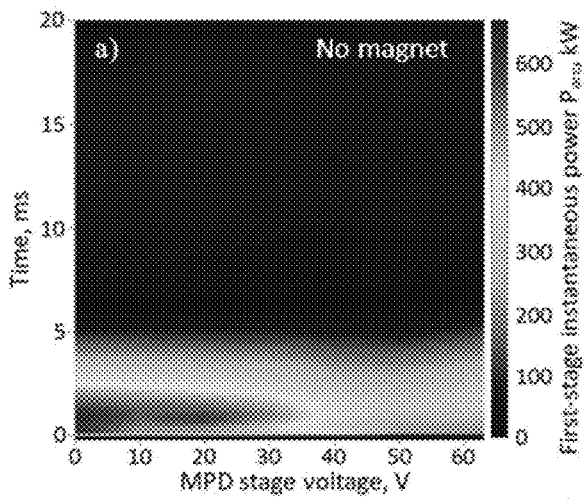
Fig. 2b
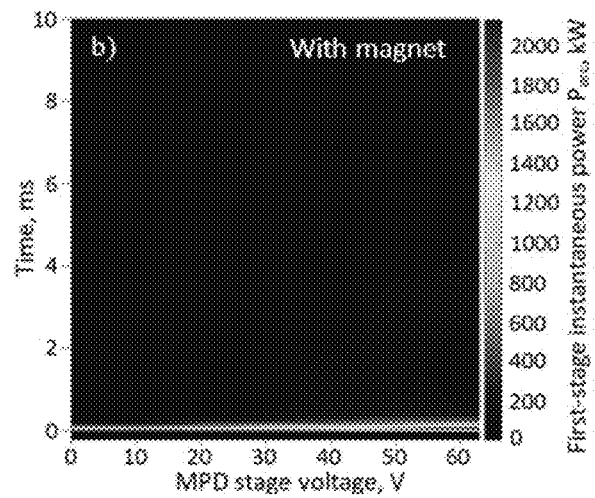
Fig. 2c
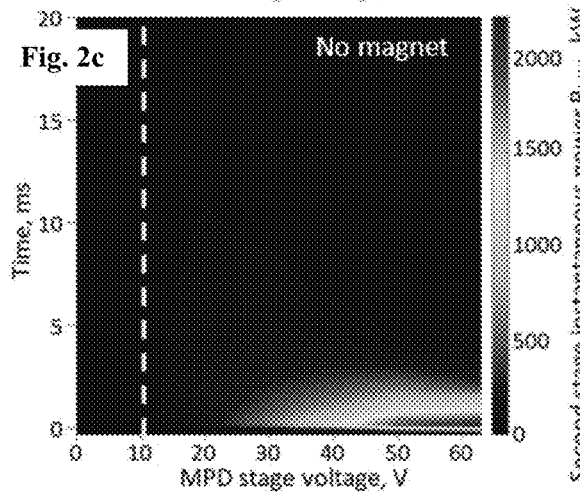
Fig. 2d
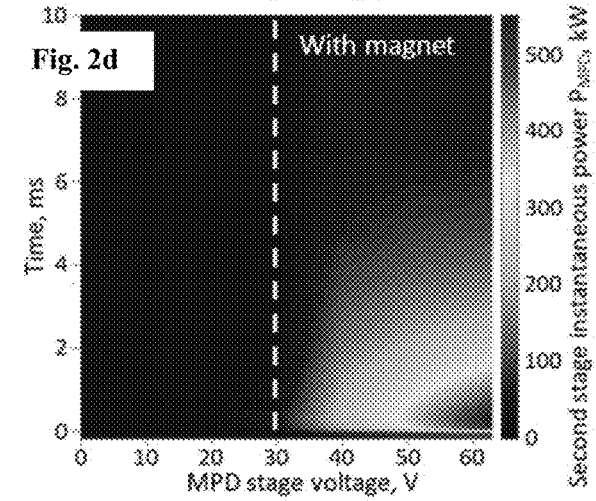
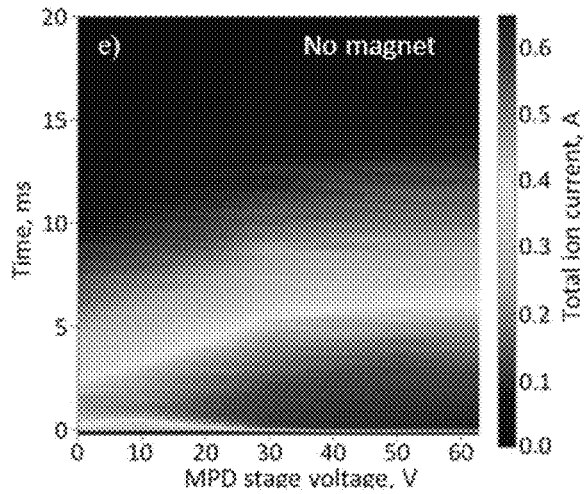
Fig. 2e
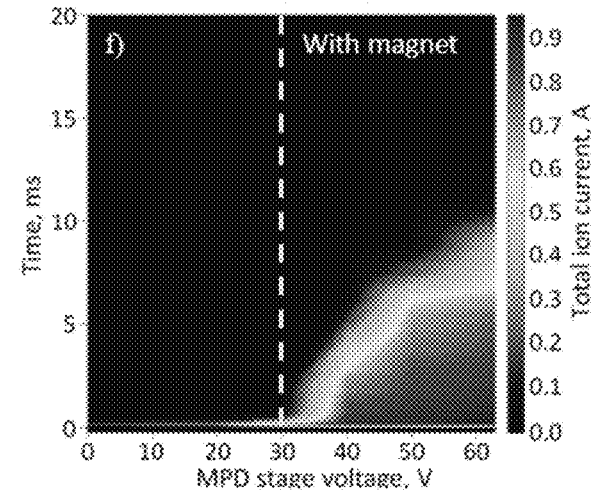
Fig. 2f

TWO-STAGE LOW-POWER AND HIGH-THRUST TO POWER ELECTRIC PROPULSION SYSTEM

CROSS-REFERENCE TO RELATED APPLICATION

This application is a national phase application of PCT/US2021/019073, filed Feb. 26, 2021, which claims the benefit of priority of U.S. Application Ser. No. 62/981,828, filed on Feb. 26, 2020 and entitled Two-Stage Pulsed Magneto Plasma-Dynamic Accelerator. The contents of these applications are incorporated herein by reference in their entirety.

This invention was made with government support under grant no. 1747760 awarded by the National Science Foundation, grant no. FA9550-19-1-0166 awarded by the U.S. Air Force Office of Scientific Research, and grant no. NNX15AT64H awarded by the National Aeronautic and Space Administration. The government has certain rights in the invention.

FIELD OF THE INVENTION

The present invention relates to two-stage propulsion systems that may be used for maneuvering satellite devices, such as CubeSats, nano satellites, and microsatellites (e.g., less than 100 kg class satellites), or larger satellites. More specifically, the present invention relates to the onset of the magnetized arc and its positive effect on the momentum of a low-power two-stage pulsed magneto dynamic propulsion system.

BACKGROUND

Two-stage propulsion systems provide efficient maneuvering of satellites. This is particularly true when performing more than one specific application, such as orbit raising maneuvers where high thrust is required, and a specific thruster will be needed, and station-keeping, where one would prefer a thruster with high specific impulse ($I_{sp}$). Therefore, two separate single-stage thrusters are needed if both maneuvers are to be performed efficiently.

Some examples of two-stage propulsion systems are the P5-2 (5 kW) thruster which was designed and tested at the University of Michigan, the Helicon Hall Effect Thruster (600 W-1200 W), the Linear Gridless Ion Thruster (2 kW), the VASIMR engine (200 kW), the D-80 Thruster with Anode Layer (TAL, 3 kW), and the Very High Specific Impulse Thruster with Anode Layer (VHITAL, 25-36 kW), amongst many others. As an example, the VHITAL thruster yields a TPR of 26 mN/kW and an $I_{sp}$ of 6000 s in single-stage mode, whereas in the two-stage mode, the TPR drops to 19.7 mN/kW but the $I_{sp}$ increases to 8000 s. Single-stage operation in Hall-effect thrusters (HET) and TAL systems is limited to voltages of around 1 kV and after this point, they experience a significant drop in efficiency due to severe anode heating. This can be overcome by separating the ionization and the acceleration regions, i.e. with a two-stage system. These systems, however, have their drawbacks.

A two-stage propulsion system has two modes of operation versus a single stage system. In a two-stage mode, the ionization stage is separate from the acceleration stage. In a single stage operation, the thruster provides a high thrust-to-power ratio (TPR) and is ideal for orbital change maneuvers, whereas the two-stage operation provides a higher specific impulse and is ideal for station-keeping and interplanetary missions, where efficient use of the propellant is more important than thrust. The use of two-stage thrusters benefits a broad number of missions, such as all-electric satellites for geostationary applications (high-thrust LEO (Low Earth Orbit) to GEO (Geostationary Orbit) transfer, high $I_{sp}$ station-keeping and drift corrections once in orbit. Interplanetary probes and sample return missions to asteroids also benefit from this development.

Magneto Plasma Dynamical (MPD) thrusters are powerful (with average power within the range of kW—hundreds of kW), high-thrust propulsion engines with electromagnetic Lorentz force J×B that accelerates and expels plasma and creates the thrust. MPD thrusters have the high thrust density and do not require ion-absorbing grid system, dangerous high voltages and lifetime-limited cathode neutralizers. In applied-field MPD thrusters that use an external coil to create a magnetic field, the Lorentz force is generated mainly as a result of vector product of a large current flowing in azimuthal direction in plasma and radial component of magnetic field of the coil. However, known MPD thrusters can achieve high efficiency (around 70%) only at very high power levels (~20 kW).

The fast-growing popularity of small satellites for LEO and even interplanetary space missions means there is a need for new types of efficient, light-weight, reliable and low-power propulsion systems.

SUMMARY

The present invention provides a satellite propulsion system that comprises a first ionization stage the comprises a plasma source configured to produce an arc discharge and emit a preliminary plasma, the plasma source including an external magnetic field configured to magnetize the arc discharge. A second acceleration stage of the system comprises an accelerator positioned in series with the plasma source, the accelerator being configured to accelerate the preliminary plasma out through the accelerator, thereby creating an accelerated plasma flow. The application of an activation threshold voltage to the accelerator results in a surge in system performance parameters.

In certain embodiments, the system performance parameters include one or more of thrust, thrust-to-power ratio, and system efficiency; the plasma source has an output for emitting the preliminary plasma; and the accelerator is positioned near the output to receive the preliminary plasma emitted from the plasma source; the accelerator is an electrode; and/or the electrode is a metal cone that has an inlet opening and an outlet opening, the inlet opening is configured to receive the preliminary plasma and the metal cone is configured to accelerate the plasma flow through the outlet opening.

In other embodiments, the magnetic field is created by a magnet positioned at an interface of the plasma source and the accelerator; the magnet is a magnetic ring; the activation threshold voltage is about 30 Volts; acceleration of the preliminary plasma by the accelerator occurs due to an electromagnetic Lorentz force; the plasma source comprising a cathode surrounded by an anode with an insulator therebetween; the preliminary plasma is almost fully ionized; and/or the system is configured for low-power consumption.

The present invention may also provide a low-power plasma thruster that comprises a plasma source that has an outlet for emitting plasma; an accelerator electrode that is positioned in series with the plasma source, and the accelerator electrode has an inlet positioned near the outlet of the plasma source for receiving the plasma; and means for increasing performance parameters of the thruster via application of a threshold voltage to the thruster.

In an embodiment, the threshold voltage is about 30 Volts. In another embodiment, the accelerator electrode is a metal cone.

The present invention may further provide a method of operating a propulsion system, that comprises the steps of energizing the propulsion system to produce a preliminary plasma using low power; applying a magnetic field to an arc discharge of the preliminary plasma; accelerating the preliminary plasma to create an accelerated plasma flow; and applying a threshold voltage to create a surge in performance parameters.

In certain embodiments, the step of accelerating the preliminary plasma includes use of an accelerator electrode that receives the preliminary plasma; the threshold voltage is applied to the accelerator electrode; the threshold voltage is about 30 Volts; and/or the performance parameters of the system include one or more of thrust, thrust-to-power ratio, and system efficiency.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIGS. 2a-2f show the results demonstrating the onset of the arc in the second stage of the system, for the thruster with or without magnetic field system configurations;

DETAILED DESCRIPTION

Figure 1A:
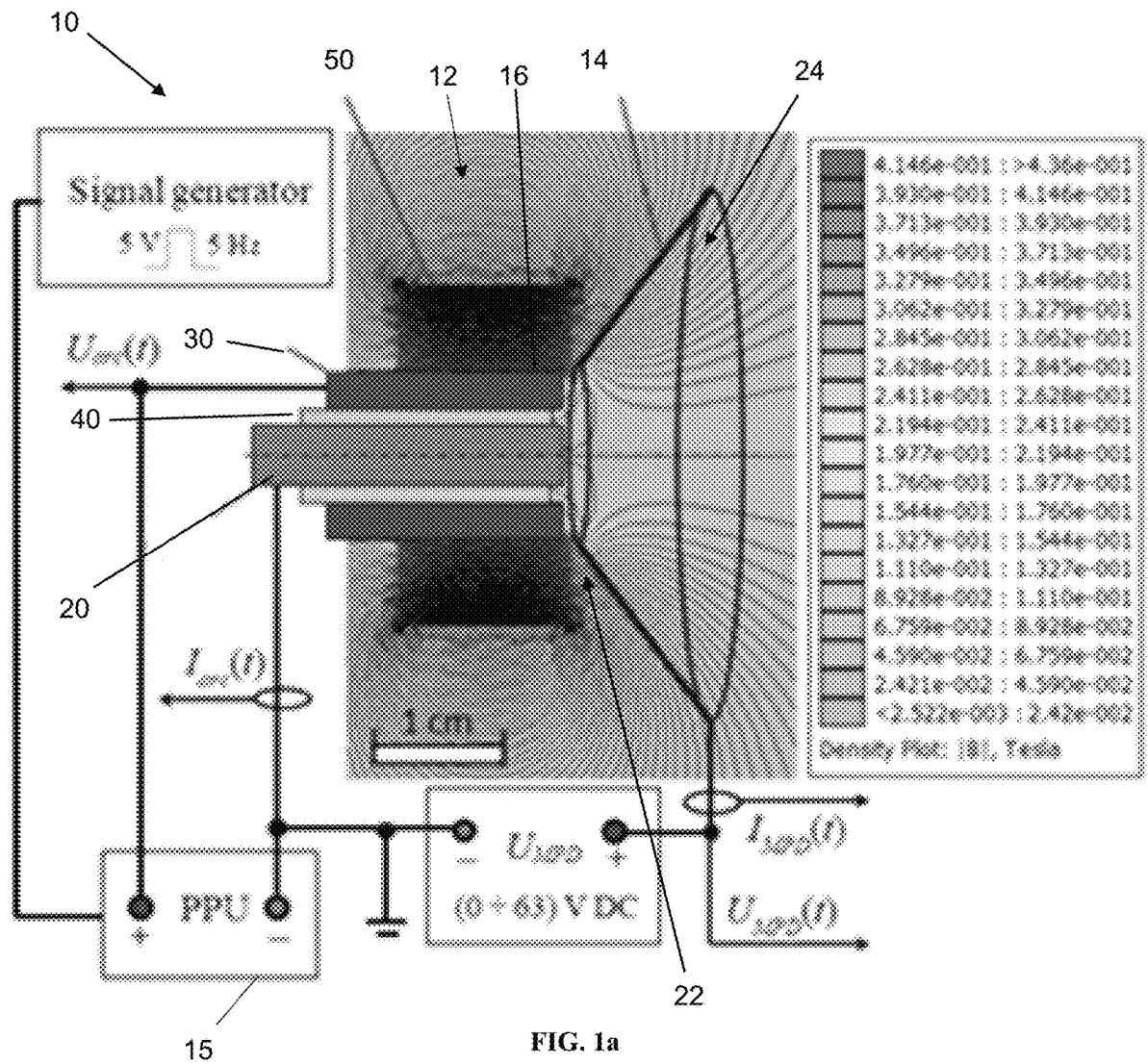
FIGS. 1a and 1b are schematics of a two-stage MPD propulsion system and its processing circuitry of according to examples of the present invention.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Referring to FIGS. 1a-8, the present invention relates to a plasma thruster and propulsion system 10, such as for small satellite propulsion. The plasma thruster and propulsion system 10 may be a low-power (less than about 30 W), two-stage pulsed magneto plasma dynamical (MPD) thruster 10, based on magnetized vacuum arc metallic plasma, and suitable for orbit raising and interplanetary missions of satellites. "Dynamical" means that the accelerating object is quasi-neutral plasma itself (not only ions), and acceleration occurs due to electromagnetic Lorentz force. Therefore, the MPD thruster has an advantage over a gridded thruster, for example, because the MPD thruster expels the neutral plasma, such that it does not require to host on the satellite any negative particles emitter (charge neutralizer). As such, the MPD thruster is more energy-effective.

The principle of the MPD stage operation is as follows. Plasma ions and electrons are expelled from a cathodic spot on the surface of the cathode 20 towards the entrance of the accelerator cone 14. The cone 14 serves as an electrode to control current distribution. The cone 14 attracts a large number of electrons, which flow toward the cone 14 and produce a large current. Plasma electrons rotate around and drift along magnetic field lines toward the surface of the cone 14. Interaction between electron current density and the magnetic field lines leads to Lorentz force directed toward the exhaust of the thruster 10. This Lorentz force accelerates both ions and electrons, fast electrons in turn accelerate ions due to electrostatic coupling, thereby increasing the total thrust of the system. An advantage of the MPD stage operation is that it is grid less, so the thrust will not decrease because of the absorption of the plasma particles by grid cells.

The propulsion system 10 of the present invention is configured to boost and improve the thrust-to-power ratio (TPR) by controlling the current in the second MPD stage; to control the transition from a single to two-stage regime by changing the voltage in the second stage of the system; and to increase thrust of the system by voltage in the second stage and by optimizing the magnetic field.

The thruster 10 of the present invention can be magnetized by an axially-symmetric dc magnetic field of ~200 mT with both axial and radial components, such that the pulsed vacuum arc discharge in the MPD thruster 10 demonstrate a threshold behavior: such parameters as thrust, thrust-to-power ratio, the power dissipating by the MPD stage, total charge of ions expelling within the single pulse, and ion-to-arc charge ratio rapidly jump or surge after a certain threshold dc voltage (e.g. about ~30 V) applied between the cathode and the accelerating (MPD) electrode. This effect can be used to controllably and drastically improve in several tens of times the thrust (from ~2 μN to ~210 μN), efficiency (from ~1% to 50%) and thrust-to-power ratio (from ~0.5 μN/W to ~18 μN/W).

The plasma thruster 10 of the present invention can be scaled down in power and size so that the applied-field MPD thruster fits inside a small satellite. And even with such reduction scaling, the thruster 10 is configured for relatively high thrust (up to mN), high efficiency, high thrust-to-power ratio (~tens of μN/W) simultaneously with the small mass, dimensions and low power consumption. The two-stage pulsed (up to ms pulse length) cm-sized low-power (0.1 W-30 W) MPD thruster 10, can have the PPU 15 for the low-power (~ several W) first-stage based on micro-cathode arc thrusters (μCATs), thereby creating almost fully-ionized preliminary plasma as a result of a trigger-less vacuum arc between two solid-state (metallic) electrodes. Preliminary plasma or plasma source 12 initiates in the first stage, and then the more powerful (~several tens of W) arc discharges in an external magnetic field in the second stage, which creates the main accelerated plasma flow of the system 10. And this plasma flow can be throttled by the varying the voltage on accelerating electrode, such as an accelerator cone 14.

The plasma accelerator system 10 of the present invention presents the physical phenomena that occurs in the thruster (e.g. a two-stage μCAT-MPD thruster)—a surge in performance parameters, such as thrust, thrust-to-power ratio and efficiency, after a certain threshold voltage applied on the accelerating electrode 14, thereby allowing a drastic increase in the above mentioned parameters.

In an example, the cone 14 is provided near the distal end 16 of the plasma source 12. The cone 14 can be a thin metal wall having a hollow center forming a discharge chamber 24. A positive signal is applied to the cone 14, which accelerates the plasma by the Lorentz force.

The plasma source 12 in the first stage of the system 10 may comprise a cathode 20 that is surrounded by an anode 30, with an insulator 40 therebetween, such as described in commonly owned U.S. Published Application No. 2020/0361636, the subject matter of which is herein incorporated by reference. The cathode 20, insulator 40, and anode 30 are concentrically and sequentially arranged with one another with the cathode 20 being innermost, as seen in FIG. 1a.

The anode 30 can be a tube that forms an outer ring or layer of the plasma source 12 and has a central bore. The insulator 40 can be a tube that has a central bore and a diameter that is smaller than the diameter of the anode 30. The cathode 20 can be a rod. The cathode 20 can be received in the bore of the insulator 40, and the insulator 40 is received within the bore of the anode 30. The cathode 20 can slide forward and rearward in the insulator to remain flush with the anode 30 as the anode is consumed.

Figure 1B:
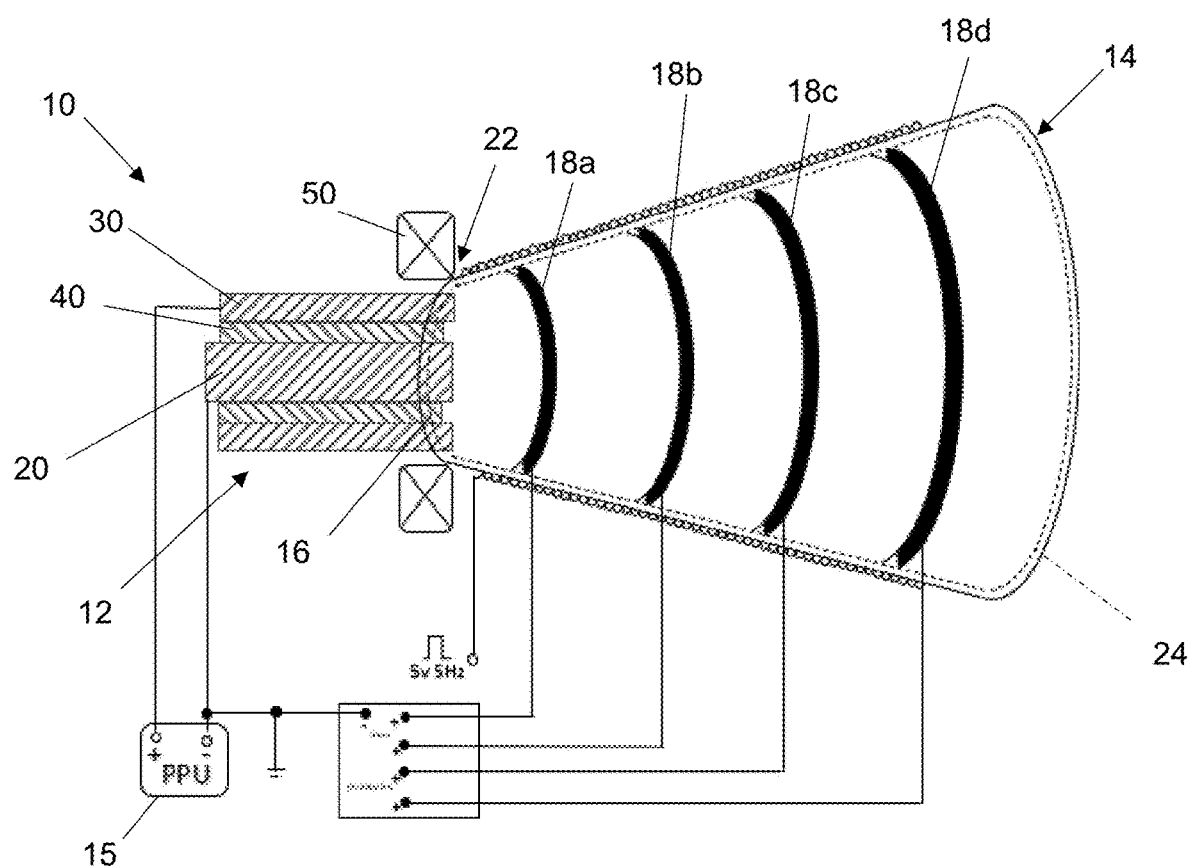

In one example, the accelerator cone 14 can have multiple rings, such as ring one 18a, ring two 18b, ring three 18c, and ring four 18d, as seen in FIG. 1B. Selective voltage can be applied to the rings 18a-18d to achieve the improved performance of the propulsion system 10.

The plasma is ignited as a result of surface flashover of the anode-cathode gap, and then is expelled from the cathodic spot toward the opening of the accelerating electrode 14. The cone 14 has an inlet opening and an outlet opening, with the outlet opening being larger than the inlet opening. This electrode had a frustum cone shape, with the smaller opening close to the end 16 of the plasma source 12. Plasma is expelled from the large outlet opening of the cone as exhaust. The cone 14 can be located in the central plane of a magnetic pulsing solenoid, fed by a pulsing power unit (PPU) 15 and producing a magnetic field with variable value of 0-120 mT. The voltage $U_a$ between grounded cathode and accelerated electrode (cone) can be set by a dc power supply (up to 63 V). The magnetic field is concentrated and the magnetic lines bent to enlarge the radial part of magnetic field in the thruster face-cone entrance interface 22.

The system 10 of the present invention can be an electric propulsion system that is based on the well-researched ablative vacuum arc or 'cathodic arc' process. There is a physical phenomenon known to erode the negative electrode (cathode) with every discharge. In this case, this is desirable as the cathode 20 is the thruster's propellant. During each discharge, a small amount of metallic propellant is eroded, ionized, and expelled by a large temperature and pressure gradient from inside the cathodic spot. The efficiency is enhanced by a magnetic field caused by the arc current as it travels through a magnetic coil that is connected in series with the thruster prior to arcing between the electrodes.

The first stage of the system 10 produces the preliminary plasma that will ultimately be accelerated using an electric field in the second stage. In an example of the present invention, a single coaxial μCAT, with the central copper cathode 20, and an outer annular copper anode 30 was used as the first-stage (preliminary source of plasma 12). This plasma was expelled toward the opening of the accelerating MPD electrode or cone 14 with a positive dc bias $U_{MPD}$ of up to 63 V. The thruster's first-stage face and the opening of the accelerating electrode 14, that is the thruster face-cone entrance interface 22, were placed in the field of an axially-magnetized permanent magnet or magnetic ring 50 with induction of ~ 0.2 T on its axis (FIG. 1a). Large electron current J toward the positively-biased accelerating MPD electrode 14, as a result of interaction between the radial component of magnetic field $B_r$, resulted in a Lorentz force $J \times B_r$ which in turn led to the acceleration of the plasma toward the opening of the accelerating electrode 14. Because $U_{MPD}$ can be easily varied, the thrust gain is also controllable.

In the first stage or ionization stage of the propulsion system 10, a voltage is provided to energize the system. The booster circuits convert the energy, thereby producing an instantaneous peak arc discharge. This instantaneous current ablates a small fraction of the anode 30 and ionizes it, producing a quasi-neutral plasma that does not require a neutralizer. The plasma plume is almost fully ionized hence eliminating potential self-contamination due to the charge exchange process in the case of a weakly ionized plasma.

In an example, the system 10 includes the first-stage pulsing power unit (PPU) 15, which can be an inductively storage pulsing circuit which stores energy in a ferrite-core inductor of 550 μH and releases it with a powerful IGBT gated by a rectangular-pulse signal generator with firing pulse repetition rate f=10 Hz. The average thrust was experimentally measured in the two ways:
(1) indirectly, by fixing the thruster on a thrust stand base, placing the thruster exhaust in front of the light-weight plate mounted on a movable arm of a micro-newton-level torsional thrust stand; and (2) by calculating using experimental data according to the formula $$T = 0.63 m_i v_i \int_0^{\tau_i} I_i(t) dt / Ze,$$

where $m_i$, $v_i$ are single ion mass and their average velocity, $I_i(t)$ is total ion current waveform with duration $\tau_i$, $Z=2$ is ion mean charge stage. Thrust-to-power ratio TPR was measured by dividing the average thrust T over the total power $P_{tot}$ which is the sum of average powers dissipated in the first-stage $P_{arc}$, in the second (MPD) stage $P_{MPD}$, and in the PPU ($P_{PPU}$):

$$TPR = T/(P_{arc} + P_{MPD} + P_{PPU}) = T/ \quad (1)$$
$$f \left( \int_0^{\tau_{arc}} I_{arc}(t) U_{arc}(t) dt + \int_0^{\tau_{MPD}} I_{MPD}(t) U_{MPD}(t) dt + \int_0^{\tau_{PPU}} I_{PPU}(t) U_{PPU}(t) dt \right),$$

where $\tau_{arc}$, $\tau_{MPD}$ and $\tau_{PPU}$ are current pulses durations in the first stage, MPD stage and in PPU, respectively. Efficiency η was estimated by dividing the average power of thruster exhaust over $P_{tot}$: η=100%×(T·$v_i$/$P_{tot}$).

The physical nature of the arc discharge allows any conductive (solid) material, e.g. copper, to be used as a propellant. The eroded material is, to a large degree, fully ionized. Additionally, it is common that the particles are multiply ionized. The arc discharge can ablate any conductive material, which allows the propulsion system or thruster 10 to operate with different metals, each with different physical properties, giving the mission designer flexibility when it comes to the mission's design. Only an electrical connection is required to operate the thruster, since the propellant and all necessary components are integrated within the thruster's structure. This provides the ability and flexibility of attaching the thruster 10 to deployable booms to increase the torque for RCS maneuvers.

The system 10 is configured to improve and optimize thrust and thrust-to-power ratio via the Magneto Plasma Dynamical (MPD) approach in the second stage of the system 10. Referring to FIGS. 2a-2e, the results demonstrating the onset of the arc in the second stage of the system 10, for the thruster with or without the magnetic field, are shown. The absence of the magnetic field results in long powerful pulses in the first stage, and the discharge arc tends to switch to dc mode (FIG. 2a). Once the magnetic field is added, the first stage produces plasma in very short and low-power pulses (FIG. 2b). This shows there is a threshold for "activation" of the second stage—after ~10 V without or no magnet (FIG. 2c), and ~30 V with magnet (FIG. 2d). Without the magnetic field, the exhausting total ion current is weakly dependent on MPD stage ($U_{MPD}$) voltage and more or less constant in time (FIG. 2e). However, with the magnetic field (With magnet), the current drastically jumps after a certain threshold of voltage, e.g. ~30 V (FIG. 2f).

Figure 3A:
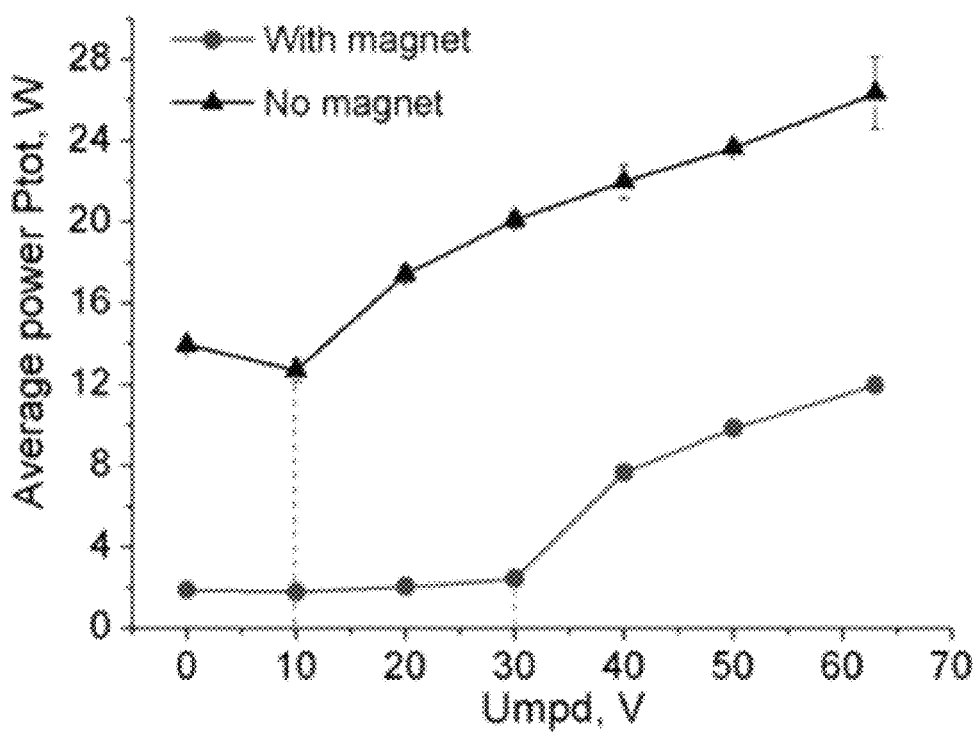
FIG. 3a is a graph that shows the onset behavior of a vacuum arc in an MPD thruster: average power dissipated in MPD stage jumps after certain threshold of $U_{MPD}$ voltage of ~10 V ("No magnet") and ~30 V ("With magnet") in accordance with an example of the propulsion system.
Figure 3B:
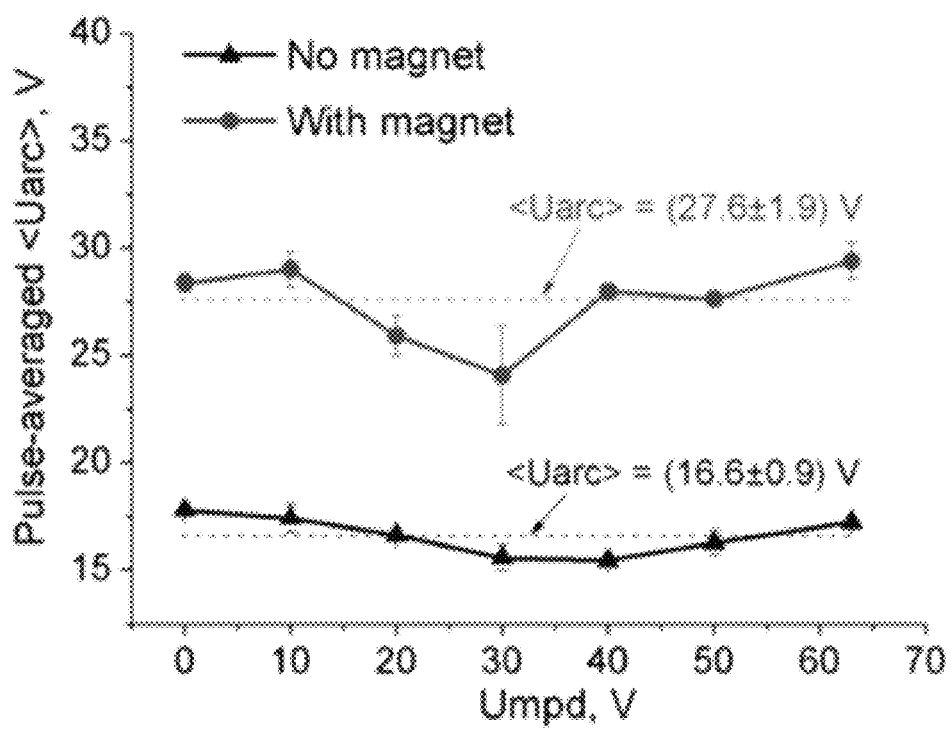
FIG. 3b is a graph showing the pulse-averaged $\langle U_{arc} \rangle$ vs. $U_{MPD}$ for the With magnet and No magnet system configurations.

FIG. 3a is a graph that shows the onset behavior of the vacuum arc in the MPD thruster: average power dissipated in MPD stage jumps after certain threshold of $U_{MPD}$, voltage of ~10 V (No magnet) and ~30 V (With magnet). FIG. 3b is a similar graph showing the pulse-averaged $\langle U_{arc} \rangle$ vs. $U_{MPD}$ for the With magnet and No magnet cases. The dashed lines in the FIG. 3b graph represent the average value of $\langle U_{arc} \rangle$.

Without the magnet, the average power, dissipating in the first stage of the system 10, does not depend on MPD stage voltage and remains comparable with the power in the second stage. However, with magnet, the first-stage power abruptly drops to just several watts, and after certain $U_{MPD}$ voltage (~30 V), the highest power now is dissipating in the MPD stage, but this power with magnet is much less than without magnet, as shown in FIG. 3a. These demonstrate that the magnetic field positively effects the thruster's performance by decreasing the power losses in the first stage, preventing switching into dc arc, and enhancing the plasma generation and its acceleration in the second stage.

Such threshold-like behavior is observed not only in "with magnet" case, but also in the "no magnet", as seen in FIG. 3a. This suggests that this happens due to electric field-related effect, and the magnetic field enhances that effect. One factor responsible for the threshold voltage value, is related to the first-stage pulse-averaged arc burning voltage:

$$\langle U_{arc} \rangle = \frac{1}{\tau_{arc}} U_{arc}(t) dt \quad (2)$$

The dependences of $\langle U_{arc} \rangle$ on $U_{MPD}$ for the "with magnet" and "no magnet" cases are given in FIG. 3b. One can see that pulse-averaged $\langle U_{arc} \rangle$ weakly depends on $U_{MPD}$ voltage, but strongly depends on the presence of magnetic field. Also we may see that the average values of $\langle U_{arc} \rangle$ (27.6 V and 16.6 V) are very close to the respective threshold voltage values for the "with magnet" and "without magnet" cases (~30 V and ~10 V, respectively).

At the initial moment of the arc ignition (when there is no plasma), the anode-cathode voltage formed by the first-stage of the system 10 has a form of a quite high (with the amplitude of up to several hundreds of volts) but very short peak. Once plasma is ignited, this voltage drops down to the arc burning voltage defined by the cathode material and which can be estimated according to equation (2) above. First-stage plasma acquires potential close to the potential of the anode 30 (i.e. arc burning voltage), therefore, any voltage on MPD stage below this plasma potential (i.e. below the pulse-averaged arc burning voltage) will repel electrons from the MPD electrode 14 and therefore electron current $I_{MPD}$ toward MPD electrode will be close to zero. After increase of $U_{MPD}$ to the values higher than $\langle U_{arc} \rangle$, plasma electrons feel the accelerating field from the cathode 20 toward the MPD electrode 14, and their current $I_{MPD}$ toward MPD electrode grows with the $U_{MPD}$ voltage.

Figure 4A:
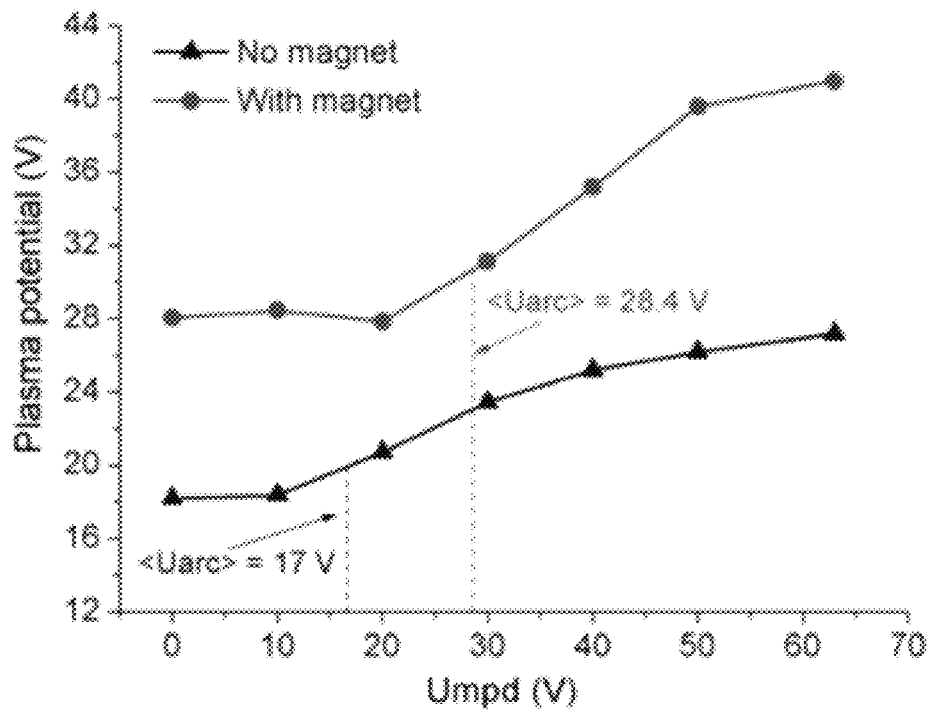
FIG. 4a is a graph showing the pulse-averaged plasma potential with respect to a grounded cathode, versus $U_{MPD}$, for With magnet and No magnet system configurations.
Figure 4B:
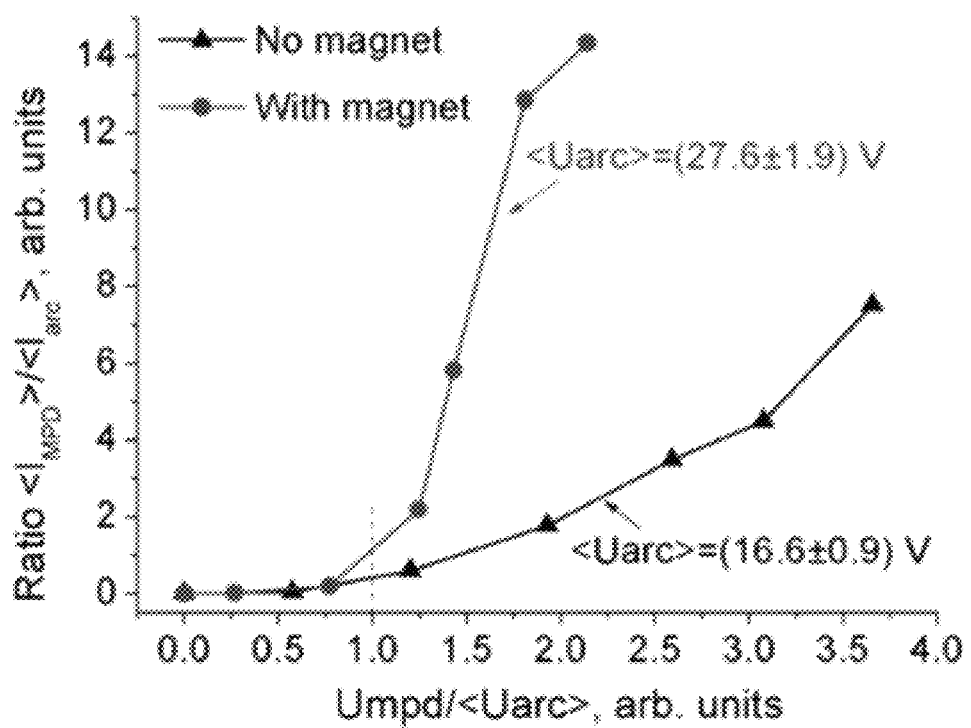
FIG. 4b is a graph showing the pulse-averaged $I_{MPD}/I_{arc}$ ratio vs. $U_{MPD}/\langle U_{arc} \rangle$, for With magnet and No magnet system configurations.

FIG. 4a is a graph showing the pulse-averaged plasma potential with respect to grounded cathode, versus $U_{MPD}$, for "with magnet" and "no magnet" cases. The dashed lines in FIG. 4a correspond to the pulse-averaged arc burning voltages. FIG. 4b is a graph showing the pulse-averaged $I_{MPD}$/$I_{arc}$ ratio vs. $U_{MPD}/\langle U_{arc} \rangle$, for "with magnet" and "no magnet" cases.

In the case with the presence of the magnetic field, the first-stage plasma electrons are magnetized, and therefore pulse-averaged arc burning voltage becomes much higher. Therefore, in order to attract electrons toward MPD electrode 14, higher $U_{MPD}$ voltages are required. This leads to the higher threshold values. This assumption is supported by the measurements of a pulse-averaged plasma potential versus $U_{MPD}$ in the "with magnet" and "no magnet" cases.

Experimental setup for this measurement included a ceramic tube with mounted Langmuir probe tip (e.g. a ring with diameter 2 mm and the length 1 mm). The ring was mounted on the end of the ceramic tube, placed at and aligned with the axis of the thruster, with the ring directed toward the cathode. The Langmuir probe was movable along the axis with 0.5 mm step. During the experiment, the position of the probe tip was fixed at around 0.5 mm from the anode. Floating potential was measured by a voltage sensor, connected to the probe tip via a BNC cable. Floating potential was measured in the two modes: with and without the magnet, versus $U_{MPD}$ voltage (0-63 V), for the same other experimental parameters kept unchanged. The floating potential waveform data was used to directly calculate pulse-averaged plasma potential $\langle \varphi_p \rangle$ according to the formula:

$$\langle \varphi_p \rangle = \langle \varphi_{fl} \rangle + \ln(m_i/2\pi m_e) kT_e/2e \qquad (3)$$

where $\langle \varphi_{fl} \rangle$ is the pulse-averaged probe floating potential. Here, the electron temperature $T_e$ was assumed to be independent from the presence of the magnetic field and was taken to be equal to 3.5 eV for copper vacuum arc plasma. One can see from FIG. 4a that the plasma potential significantly changes with $U_{MPD}$, while $\langle U_{arc} \rangle$, as follows from FIG. 3b, changes slightly. This is understood because for the fixed electron temperature, plasma potential will be strongly dependent on electron loss rate determined by the potential on the neighboring electrodes (mainly, on MPD electrode). However, one can see that plasma potential is connected with the arc burning voltage, because this potential starts growing after $U_{MPD}$ exceeds $\langle U_{arc} \rangle$ for corresponding "with magnet" or "no magnet" cases.

Another reason for the an abrupt increase in thruster performance is due to a drastic growth in current to the second MPD stage of the system 10 happening when $U_{MPD}$ exceeds the plasma potential, are the ratios of pulse-averaged $\langle I_{MPD} \rangle / \langle I_{arc} \rangle$ versus $U_{MPD}/\langle U_{arc} \rangle$ given in FIG. 4b. It is seen that for the both cases, there is no $\langle I_{MPD} \rangle$ current at $U_{MPD}$ less than $\langle U_{arc} \rangle$ (i.e. for $U_{MPD}/\langle U_{arc} \rangle$ less than 1), and there is a significant increase of $\langle I_{UPD} \rangle / \langle I_{arc} \rangle$ after this value.

To find out the region of ions acceleration inside the volume of the cone 14 we assume that the total flow of ions entering the narrow part of the cone 14 will be the same at the exhaust of the cone 14 (since MPD electrode is positive and ions will be reflected from its walls). Therefore, the expression for the ion flow valid for any cross-section of the cone and even further:

$$j_{i0} S_0 = j_z S_z \qquad (4)$$

where $j_{i0}$ is the ion current density at the plane of the cone narrow opening having cross-sectional area $S_0$, $j_z$ and $S_z$ are the corresponding values at any axial coordinate z. Assuming that $v_i(0) = v_i(z)$, the final expression for the normalized ion density function vs. axial coordinate:

$$n_i(z)/n_i(0) = r_0^2/r_0 + z \cdot tg\alpha)^2 \qquad (5)$$

One can expect that if the ions are accelerating with z coordinate ($v_i(0) \neq v_i(z)$), the experimentally-measured $n_i(z)/n_i(0)$ will go steeper than the calculated according to equation (5) above, and this could help to find the region of ions acceleration. Such experiment was conducted using the axially-movable Langmuir probe described above. The initial axial coordinate (z=0) was adjusted to the cathode surface, then the probe tip coordinate was varied in step of 2 mm, from 1 mm up to 22 mm with respect to the cathode surface. The probe tip was biased with a battery set to −53 V with respect to ground. Ion current waveform was measured as a voltage across a 100 Ohm resistor. Since the probe surface was directed perpendicular to the supersonic plasma flow, a Bohm formula was used to calculate a pulse-averaged ion density $\langle n_i \rangle$ from the probe current:

$$\langle n_i \rangle = (\sqrt{m_i}/A_p \cdot Z \cdot e \cdot \sqrt{2kT_e}) \langle I_i \rangle \qquad (6)$$

where $A_p$ is the probe surface area, $$\langle I_i \rangle = \frac{1}{\tau_i} \int_0^{\tau_i} I_i(t) dt$$

is a pulse-averaged ion current calculated from the ion current waveform measured by the probe tip.

Figure 5A:
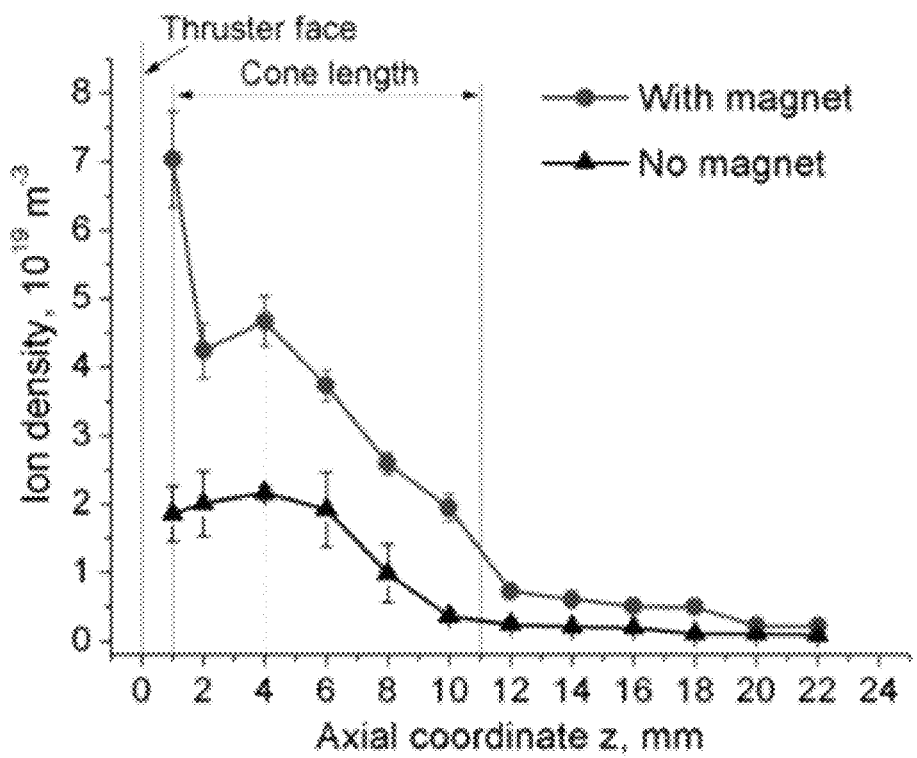
FIG. 5a is a graph showing the pulse-averaged ion density vs. axial coordinate, at $U_{MPD}$=63 V, for With magnet and No magnet system configurations.
Figure 5B:
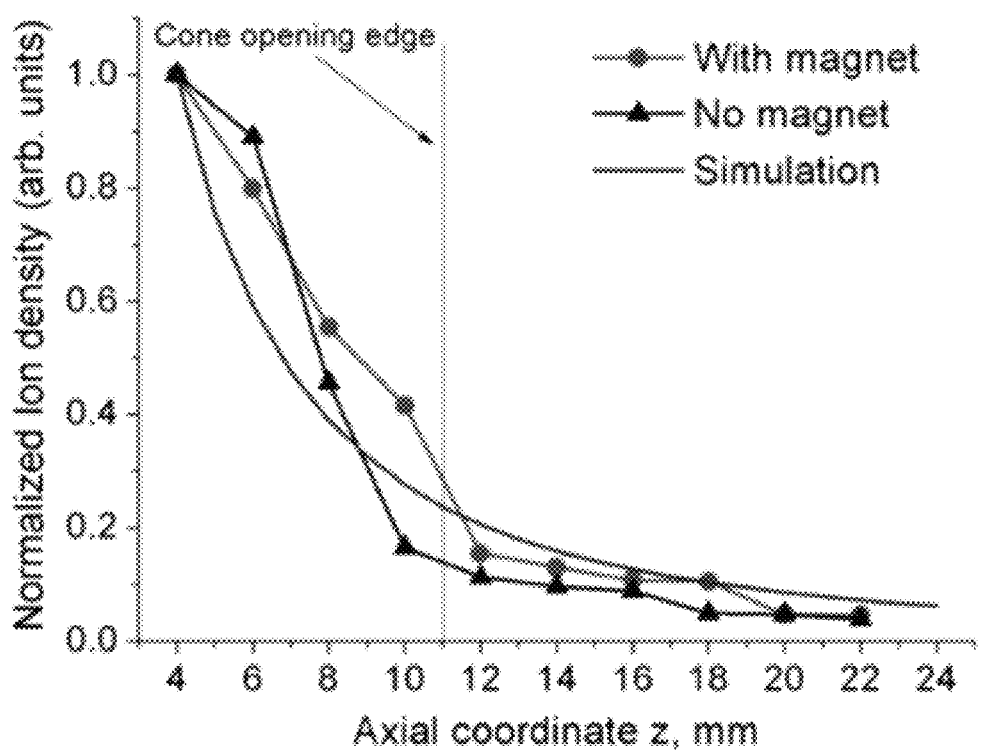
FIG. 5b is a graph showing the normalized (to their maxima at z=4 mm) curves of pulse-averaged ion density vs. z, for With-magnet and No magnet configurations, and simulation.

The results of the experiments and simulation are given in FIG. 5a and FIG. 5b. FIG. 5a is a graph showing the pulse-averaged ion density vs. axial coordinate, at $U_{MPD}$=63 V, for "with magnet" and "no-magnet" configurations. Axial coordinates for the face of the thruster first stage, and cone boundaries are given by the green solid lines in FIG. 5a. FIG. 5b is a graph showing the normalized (to their maxima at z=4 mm) curves of pulse-averaged ion density vs. z, for "with magnet" and "no magnet" configurations, and simulation (blue line).

One can see that absolute values of ion density for "with magnet" configuration in times higher than for the "no magnet". It is a rapid drop of ion density in the few millimeters from the cone opening for "with magnet" configuration, which can be probably due to the localization of ion accelerating region in this area (the region with the high density of magnetic field and with the highest current density flowing from the first stage towards the accelerating cone). However, for the "no magnet" configuration, there is no drop of ion density; instead of dropping, ion density slightly grows to some maximum at about z=4 mm, and then goes down (FIG. 5a). After a local maximal point at z=4 mm inside the cone, ion density curves decay for the both configurations (FIG. 5b). This decay is due to a free expansion of the plasma, and may happen at the constant velocity of ions in this region.

Figure 6A:
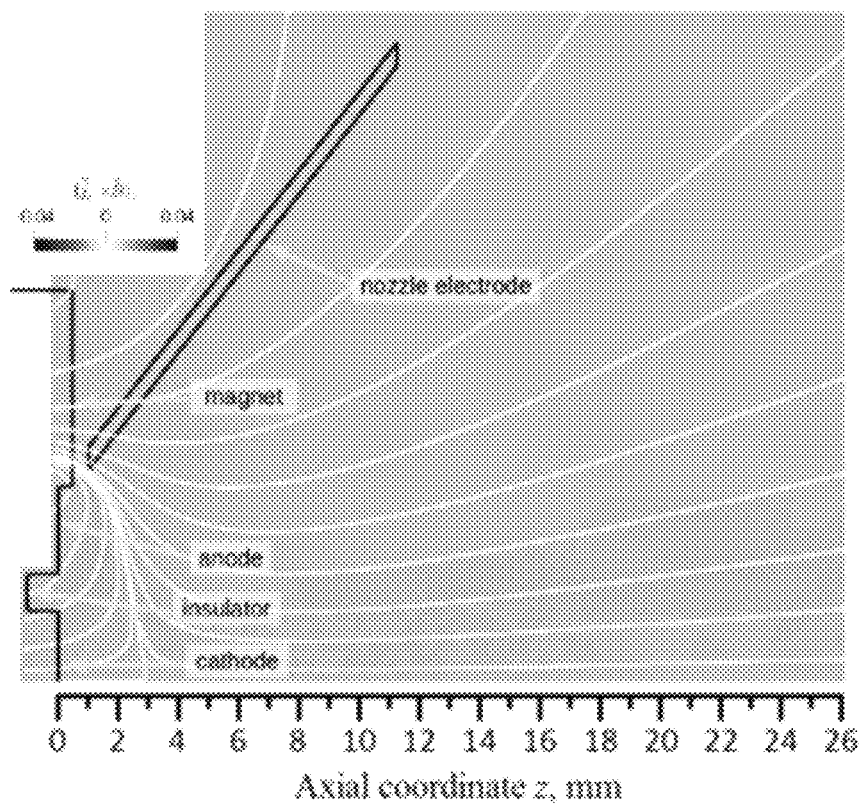
FIGS. 6a and 6b illustrate particle-in-cell (PIC) simulations of the physics of the thrust gain and the threshold behavior of a μCAT-MPD thruster of an exemplary embodiment of the present invention.
Figure 6B:
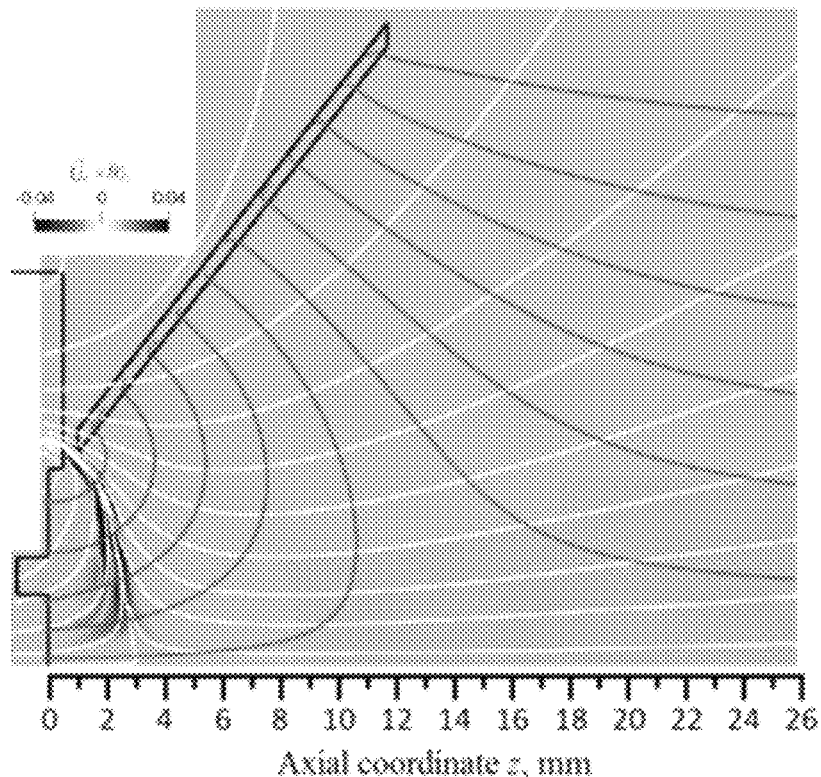

The physics of the thrust gain and the threshold behavior of the µCAT-MPD thruster system 10 is illustrated using particle-in-cell (PIC) simulations shown in FIGS. 6a and 6b, showing the normalized axial component of the Lorentz force for $U_{MPD}$=0 (a) and $U_{MPD}$=63 V. The white lines in FIGS. 6a and 6b depict the magnetic field and the purple lines denote the electric field. These simulations have been performed using the open-source, two-dimensional electrostatic particle-in-cell code Starfish. The computational domain consisted of a Cartesian mesh with varying resolution and linear splines denoting the thruster. The magnetic field was modeled in FEMM and subsequently imported into the simulation. Electrons and copper ions are introduced at random position within the "beam" by picking random positions within a cylindrical region extending from the cathode to the nozzle exit. Both ions and electrons were sampled from the Maxwellian distribution with T=5000 K and drift velocity $v_z$=50 km/s. The fully kinetic electrostatic particle-in-cell (ES-PIC) method was then used to advance particle velocities and positions. The simulation was run for 5000 $5 \times 10^{-12}$ s time steps which was a sufficient time to establish a steady state within the electron population. Particle velocities were interpolated to the grid to compute mesh-averaged macroscopic stream velocities. Subsequently, electron current density was computed from $j_e = -en_e \vec{v}_e$, and the Lorentz force was computed by taking a cross-product with the magnetic field. The two simulations in FIGS. 6a and 6b compare the impact of the accelerator electrode voltage on this component. With $U_{MPD}=0$, no noticeable contribution to thrust from the Lorentz force is observed. However, with $U_{MPD}=63$ V, there is a clear axial contribution.

From the simulation results given for $U_{MPD}=63$ V (FIG. 6b), one can see that the region of the maximal values J×B force (at the distances between 1 and 3 mm from the cathode surface) agrees well with the experimentally-observed region of the acceleration of the ions (FIG. 5a, With magnet case). This further proves that it is the J×B force that causes the increase in thrust.

Figure 7A:
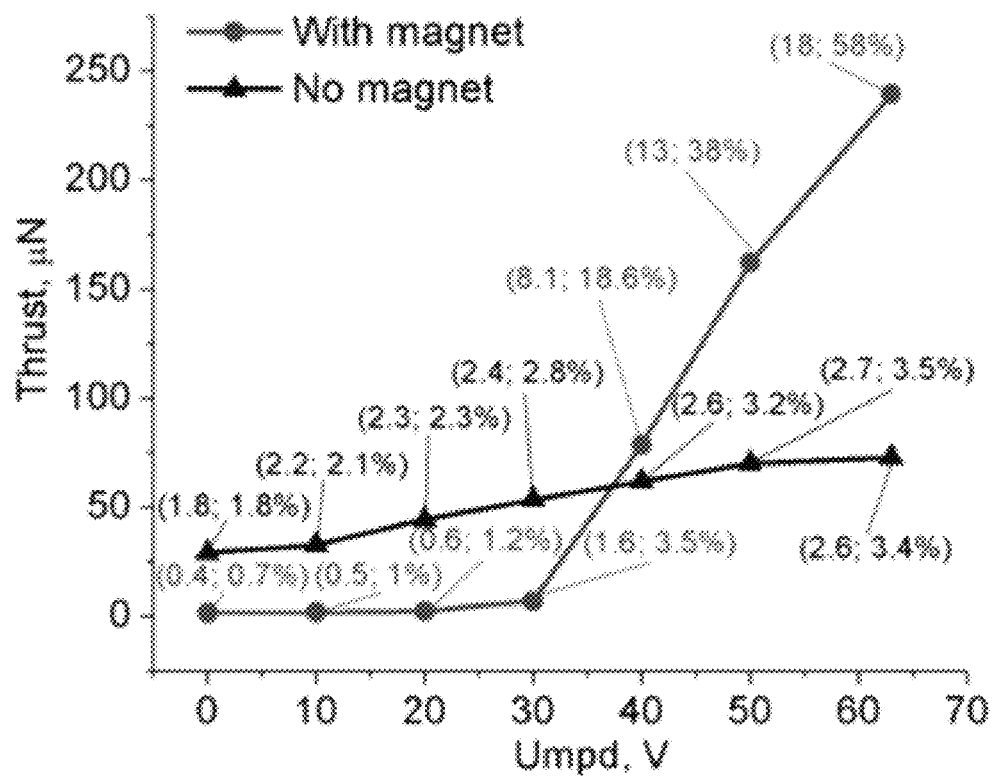
FIGS. 7a and 7b are graphs showing the thrust, estimated from the electrical measurements of the thruster in With-magnet and No-magnet system configurations.
Figure 7B:
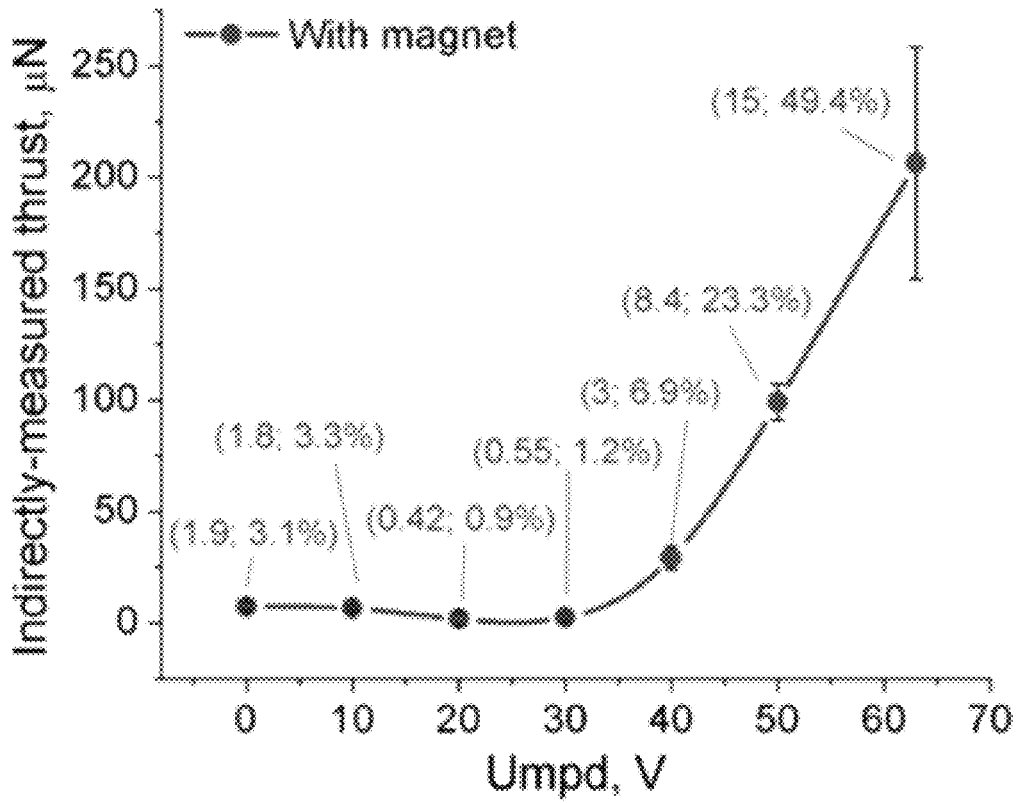

The discovered onset of the magnetized vacuum arc in two-staged μCAT-MPD thruster system 10 allows drastically increasing its thrust, TPR and efficiency, as illustrated in FIGS. 7a and 7b. FIGS. 7a and 7b are graphs showing the thrust, estimated from the electrical measurements of the thruster in With magnet and No magnet configurations (a), and indirectly-measured thrust (b) using the thrust stand in configuration With magnet". The first numbers in the brackets mean thrust-to-power ratio (in μN/W) and second ones with percent mean efficiency for the respective data points.

From the FIGS. 7a and 7b, one can see that with the magnetic field, at low $U_{MPD}$, voltages (0-30 V), the thrust and TPR values (2-10 μN and 0.5-2 μN/W) remain low and comparable with the respective parameters of single-stage μCATs achieved before without any acceleration stages. However, after $U_{MPD}$, voltage increase from ~30 V to its maximal value of 63 V, both thrust and TPR rapidly grow and reach 210 μN and 15 μN/W, respectively, together with the high efficiency of ~50%. In the thruster without the magnet (FIG. 7a "No magnet"), thrust, TPR, and efficiency grow insignificantly with $U_{MPD}$.

Figure 8:
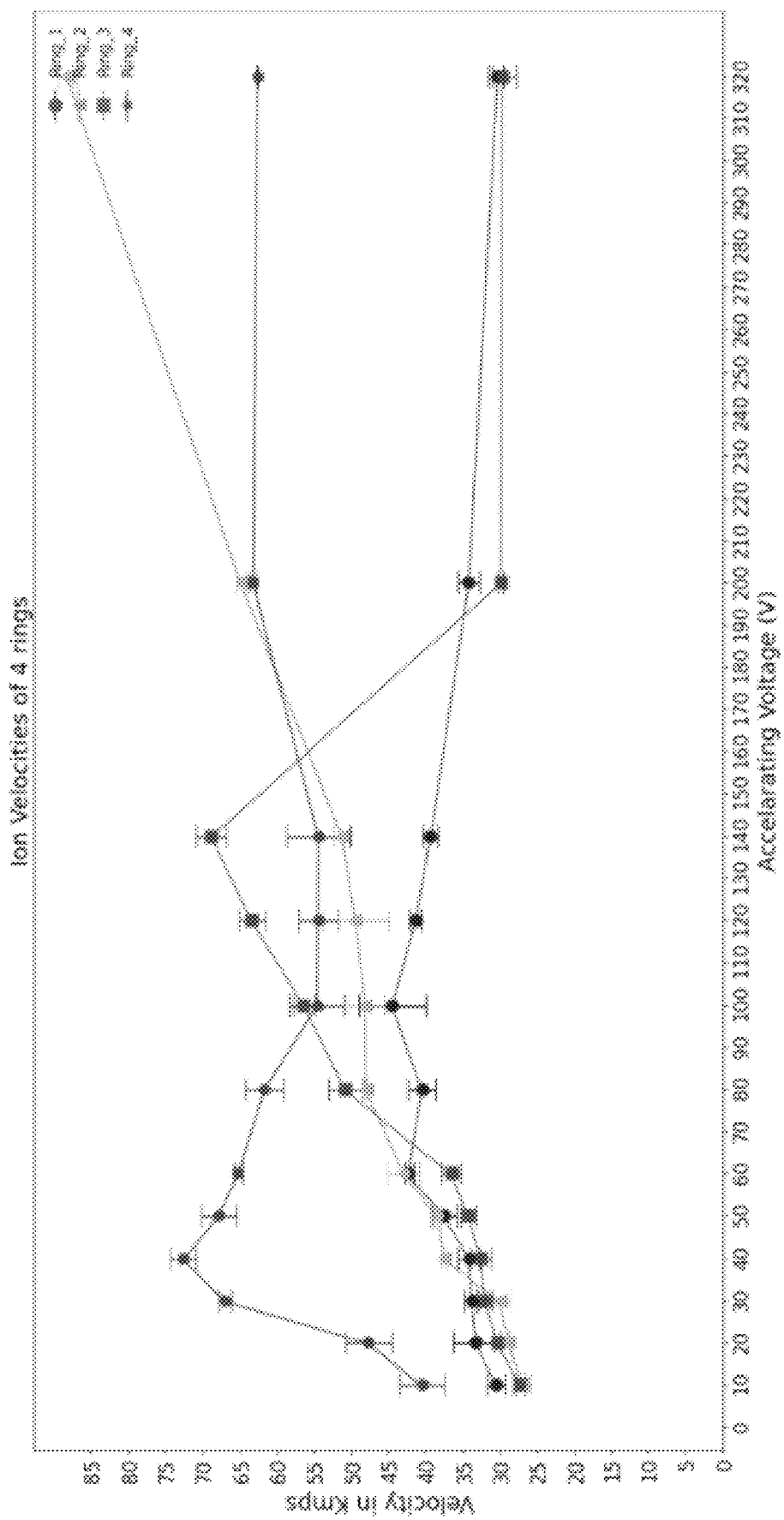
FIG. 8 is a graph showing Ion velocities with respect to Accelerating Voltage applied to each ring, respectively, of the propulsion system according to an exemplary embodiment of the present invention.

Referring to FIGS. 1B and 8, application of J×B via biasing segmented electrodes leads to significant increase in ion velocity. The four rings 18a-18d of cone 14 are acting as accelerating anodes. The voltage can be applied to each ring 18a, 18b, 18c, and 18d individually. The voltage at each ring 18a-18d can be the same or different than the voltages received at the other rings 18a-18d. For the rings one and three 18a and 18c, initial velocities of ions range from 26 to 30 kmps. As shown in the example of FIG. 1a, the rings can be a conductive material such as a metal strip, wire or conductor. The rings 18a-18d can extend circumferentially about the entire inner circumference of the cone 14 inside the discharge chamber 24. For instance, the rings 18a-18d can be connected to the inner surface of the cone and project outward from the inner surface of the cone. Or the rings 18a-18d can be integrally with the cone 14 and recessed at the inner surface to be flush with the inner surface of the cone 14. The cone is outwardly tapered with respect to the distal end 16 of the plasma source 12; accordingly, the rings 18a-d get incrementally larger the further from the plasma source 12, with the closest ring (here, the first ring 18a) having the smallest diameter and the furthest ring (here, the fourth ring 18d) having the largest diameter. The rings 18a-d are spaced apart from one another at equal distances along the cone 14 with respect to the plasma source 12, though the distances need not be equal. Each ring 18a-18d forms a complete circle and the rings are arranged substantially parallel to one another, though in one embodiment the rings 18a-18d need not be a complete circle but can instead partially extend about the inner surface of the cone 14.

Upon increasing the voltage applied to rings 18a and 18c, the ion velocities for ring three 18c reached a maximum 70 kmps, but the ion velocities for both the rings 18a and 18c fell down to the same initial ion velocities of 27 Kmps at 320V and reached the saturation point, i.e. ion velocity does not decrease with further increase of applied voltage. A similar situation is observed in case of ring four 18d. Though the initial ion velocity is 44 kmps for ring 18d and reached a velocity of 73 kmps at 40V, the ring 18d nonetheless got saturated to 62 kmps at 200V. But in case of ring two 18b, though the initial ion velocities for ring two 18b coincided with ring one 18a and ring three 18c, the ion velocities of ring two 18b did not reach the saturation point, unlike the other rings. And among all the rings 18a-18d, the maximum average velocity of 82 kmps is attained by ring two 18b. From these results, considering the rings 18a-18d attribution towards ion velocities and based upon the power limitations, one can choose to selectively supply the power to the respective rings 18a-18d to acquire the desired results. Thrust and TPR growth at high $U_{MPD}$ voltages does not demonstrate any trends to saturation at this level of $U_{MPD}$ voltage. As such, there is potential of further increase at higher voltage.

A processing device (such as a computer, processor or controller) can be provided with the system 10 that controls one or more of the operations of the system, including but not limited to: (1) the arcing pulse repetition rate, (2) pulsing power unit charge voltage and, therefore, energy that will be released within one pulse, (3) current amplitudes in magnets or magnetic coils (for focusing, accelerating magnetic fields etc., (4) and voltage values on accelerating electrodes. By varying the mentioned parameters electrically, it is possible to achieve dynamic control of the system 10.

Therefore, the system 10 of the present invention provides a way to improve thrust together with the thrust-to-power ratio and efficiency of low-power MPD thrusters—due to the onset of the magnetized arc after the certain threshold voltage is applied on the second activation stage.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as right, left, above, below, upper, lower, top, bottom, linear, arcuate, elongated, parallel, near, perpendicular, circle, ring, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A satellite propulsion system, comprising:
   a first ionization stage comprising a vacuum plasma source configured to produce a vacuum arc discharge and emit a preliminary ionized plasma, the plasma source including an external magnetic field configured to magnetize the arc discharge;
   a second acceleration stage comprising a pulsed electromagnetic Lorentz accelerator positioned in series with the plasma source, the accelerator being configured to accelerate the preliminary plasma out through the accelerator using a pulsed electromagnetic Lorentz force, thereby creating an accelerated plasma flow; and
   wherein application of an activation threshold voltage to the accelerator results in a surge in system performance parameters as a result of the pulsed electromagnetic Lorentz force.

2. The system of claim 1, wherein the system performance parameters include one or more of thrust, thrust-to-power ratio, and system efficiency.

3. The system of claim 1, wherein the plasma source has an output for emitting the preliminary plasma; and the accelerator is positioned near the output to receive the preliminary plasma emitted from the plasma source.

4. The system of claim 1, wherein the accelerator is an electrode.

5. The system of claim 4, wherein the electrode is a metal cone that has an inlet opening and an outlet opening, the inlet opening is configured to receive the preliminary plasma and the metal cone is configured to accelerate the plasma flow through the outlet opening.

6. The system of claim 1, wherein the magnetic field is created by a magnet positioned at an interface of the plasma source and the accelerator.

7. The system of claim 6, wherein the magnet is a magnetic ring.

8. The system of claim 1, wherein the activation threshold voltage triggers said second acceleration stage.

9. The system of claim 1, wherein acceleration of the preliminary plasma by the accelerator occurs due to an electromagnetic Lorentz force.

10. The system of claim 1, wherein the plasma source comprising a cathode surrounded by an anode with an insulator therebetween.

11. The system of claim 1, wherein the preliminary plasma is fully ionized.

12. The system of claim 1, wherein the system is configured for low-power consumption.

13. A low-power plasma thruster, comprising:
    a vacuum plasma source having an outlet for emitting plasma;
    a pulsed electromagnetic Lorentz accelerator electrode positioned in series with the plasma source, the accelerator electrode having an inlet positioned near the outlet of the plasma source for receiving the plasma; and
    means for increasing performance parameters of the thruster via application of a threshold voltage to the thruster as a result of the pulsed electromagnetic Lorentz accelerator electrode.

14. The thruster of claim 13, wherein the threshold voltage is 30 Volts.

15. The thrust of claim 13, wherein the accelerator electrode is a metal cone.

16. A method of operating a propulsion system, comprising the steps of:
    energizing the propulsion system to produce a preliminary ionized plasma using low power, the preliminary plasma having a vacuum arc discharge;
    applying a magnetic field to the arc discharge of the preliminary plasma;
    accelerating the preliminary plasma using a pulsed electromagnetic Lorentz accelerator to create an accelerated plasma flow; and
    applying a threshold voltage to create a surge in performance parameters.

17. The method of claim 16, wherein the step of accelerating the preliminary plasma includes use of an accelerator electrode that receives the preliminary plasma.

18. The method of claim 17, wherein the threshold voltage is applied to the accelerator electrode.

19. The method of claim 16, wherein the threshold voltage is 30 Volts.

20. The method of claim 16, wherein the performance parameters of the system include one or more of thrust, thrust-to-power ratio, and system efficiency.

* * * * *